United States Patent
Sundara-Rajan et al.

(10) Patent No.: US 9,459,709 B2
(45) Date of Patent: Oct. 4, 2016

(54) SCALING VOLTAGE FOR DATA COMMUNICATION BETWEEN ACTIVE STYLUS AND TOUCH-SENSOR DEVICE

(75) Inventors: Kishore Sundara-Rajan, San Jose, CA (US); Trond Jarle Pedersen, Trondheim (NO); Vemund Kval Bakken, Menlo Park, CA (US)

(73) Assignee: Atmel Corporation, San Jose, CA (US)

( * ) Notice: Subject to any disclaimer, the term of this patent is extended or adjusted under 35 U.S.C. 154(b) by 905 days.

(21) Appl. No.: 13/329,273

(22) Filed: Dec. 17, 2011

(65) Prior Publication Data

US 2013/0106764 A1    May 2, 2013

Related U.S. Application Data

(60) Provisional application No. 61/553,114, filed on Oct. 28, 2011.

(51) Int. Cl.
  *G06F 3/0354* (2013.01)
  *G06F 3/044* (2006.01)
  *G06F 3/041* (2006.01)

(52) U.S. Cl.
  CPC ........... *G06F 3/03545* (2013.01); *G06F 3/044* (2013.01); *G06F 3/0416* (2013.01)

(58) Field of Classification Search
  None
  See application file for complete search history.

(56) References Cited

U.S. PATENT DOCUMENTS

| | | | |
|---|---|---|---|
| 4,695,680 A | 9/1987 | Kable | |
| 5,973,677 A | 10/1999 | Gibbons | |
| 7,612,767 B1 | 11/2009 | Griffin | |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |

(Continued)

FOREIGN PATENT DOCUMENTS

WO   WO 2012/129247   9/2012

OTHER PUBLICATIONS

Kyung, Ki-Uk et al., "wUbi-Pen : Windows Graphical User Interface Interacting with Haptic Feedback Stylus," *SIGGRAPH.*, Los Angeles, California, Aug. 2008.

(Continued)

*Primary Examiner* — Amr Awad
*Assistant Examiner* — Andre Matthews
(74) *Attorney, Agent, or Firm* — Baker Botts L.L.P.

(57) ABSTRACT

In one embodiment, an apparatus comprises a data-transmitting component and a data-receiving component. The data-transmitting component is operable to: select a set of first reference values and a set of second reference values respectively indicating a lower bound and an upper bound of a range of values; respectively represent the set of first reference values and the set of second reference values as a set of first pulses and a set of second pulses; represent a set of analog values as a set of third pulses, each third pulse having a third amplitude between the first amplitude of a corresponding first pulse and the second amplitude of a corresponding second pulse that is determined based on a percentage of the corresponding analog value within the range of values; and transmit the set of first pulses, the set of third pulses, and the set of second pulses to the data-receiving component.

18 Claims, 8 Drawing Sheets

(56) References Cited

U.S. PATENT DOCUMENTS

| | | |
|---|---|---|
| 8,179,381 B2 | 5/2012 | Frey |
| 2002/0039092 A1* | 4/2002 | Shigetaka .................. 345/156 |
| 2008/0238885 A1 | 10/2008 | Zachut |
| 2009/0095540 A1 | 4/2009 | Zachut |
| 2009/0115725 A1 | 5/2009 | Shemesh |
| 2009/0127005 A1 | 5/2009 | Zachut |
| 2009/0153152 A1 | 6/2009 | Maharyta |
| 2009/0184939 A1 | 7/2009 | Wohlstadter |
| 2009/0251434 A1 | 10/2009 | Rimon |
| 2009/0315854 A1 | 12/2009 | Matsuo |
| 2010/0006350 A1 | 1/2010 | Elias |
| 2010/0155153 A1 | 6/2010 | Zachut |
| 2010/0292945 A1 | 11/2010 | Reynolds |
| 2010/0315384 A1 | 12/2010 | Hargreaves |
| 2011/0007029 A1 | 1/2011 | Ben-David |
| 2012/0062499 A1* | 3/2012 | Weaver et al. ............. 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0327041 A1 | 12/2012 | Harley |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

SCALING VOLTAGE FOR DATA COMMUNICATION BETWEEN ACTIVE STYLUS AND TOUCH-SENSOR DEVICE

RELATED APPLICATION

This application claims the benefit, under 35 U.S.C. §119(e), of U.S. Provisional Patent Application No. 61/553,114, filed 28 Oct. 2011, which is incorporated herein by reference.

TECHNICAL FIELD

This disclosure generally relates to touch sensors.

BACKGROUND

A touch sensor may detect the presence and location of a touch or object or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
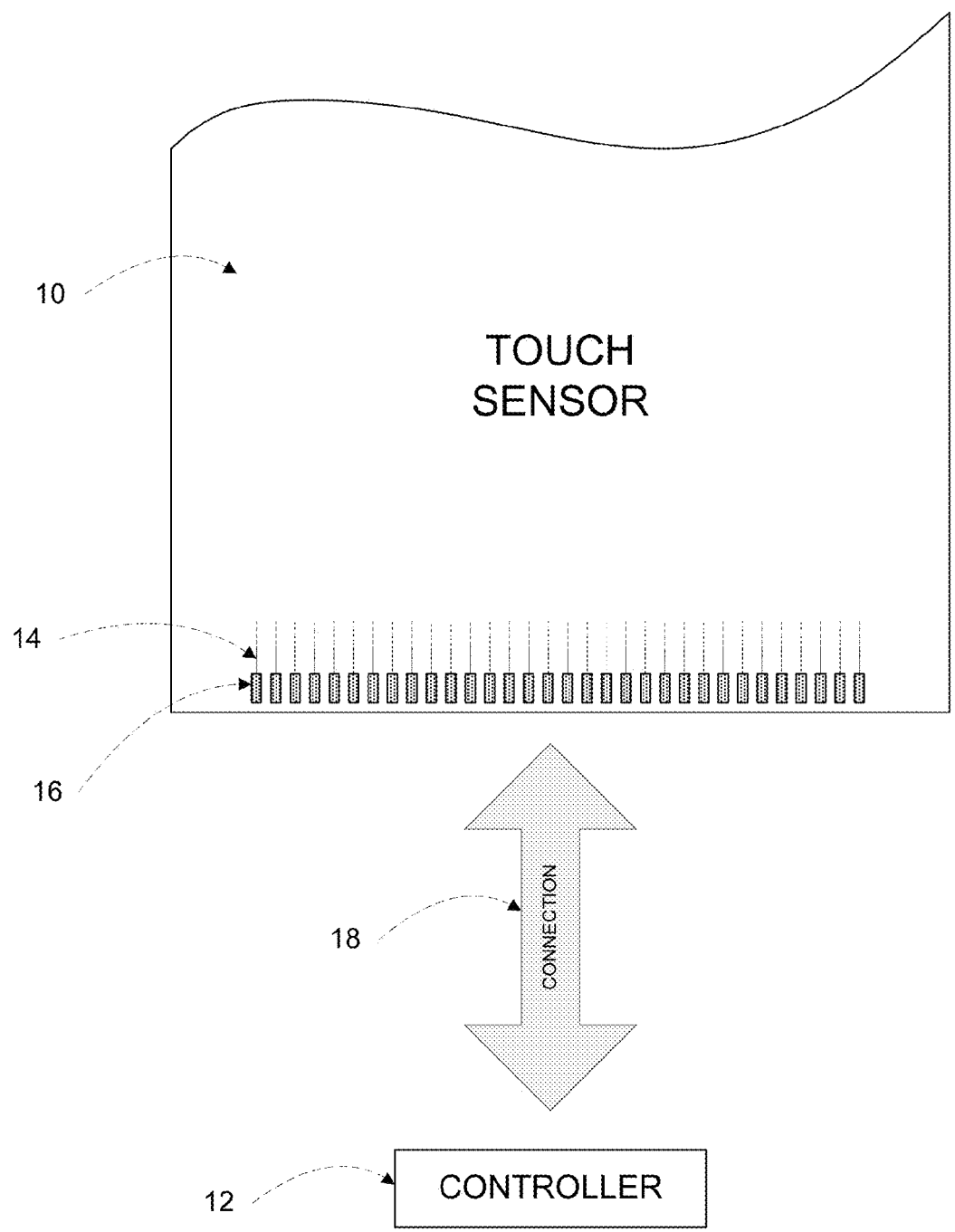
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns (μm) or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In other embodiments, connection pads 16 may be connected an electro-mechanical connector (such as a zero insertion force wire-to-board connector). In these embodiments, connection 18 may not need to include an FPC. This disclosure contemplates any suitable connection 18 between touch-sensor controller 12 and touch sensor 10.

Figure 2:
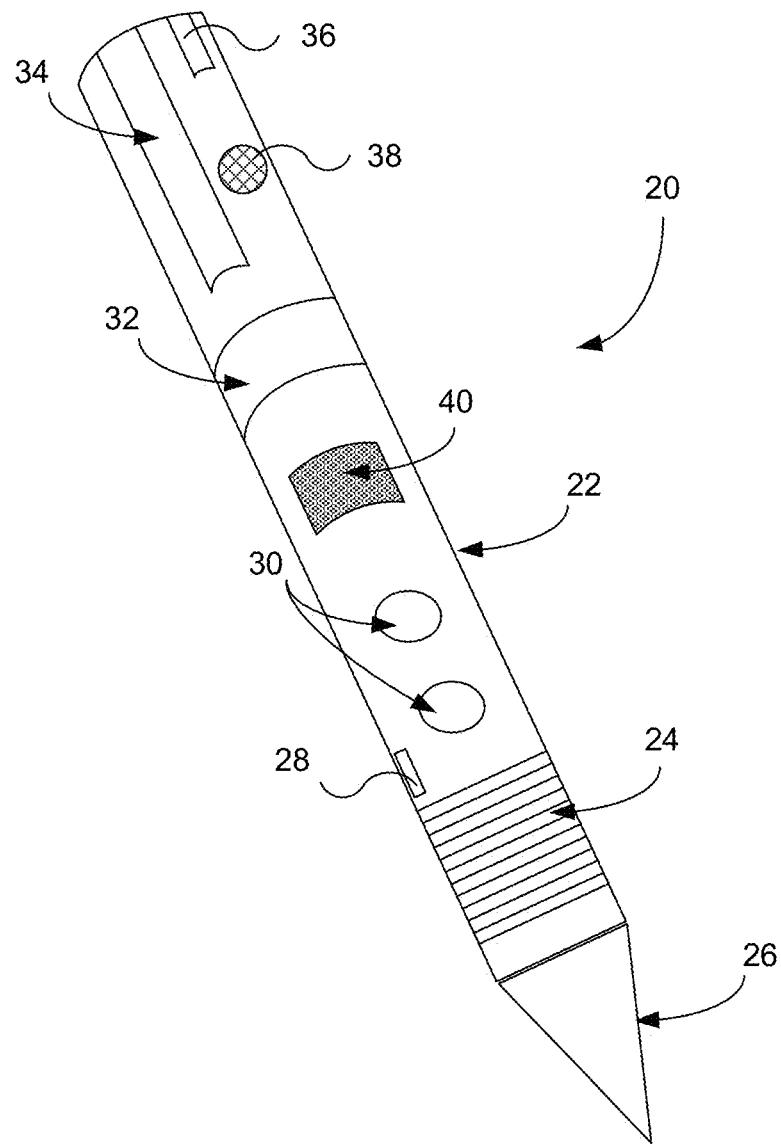
FIG. 2 illustrates an example active stylus exterior.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
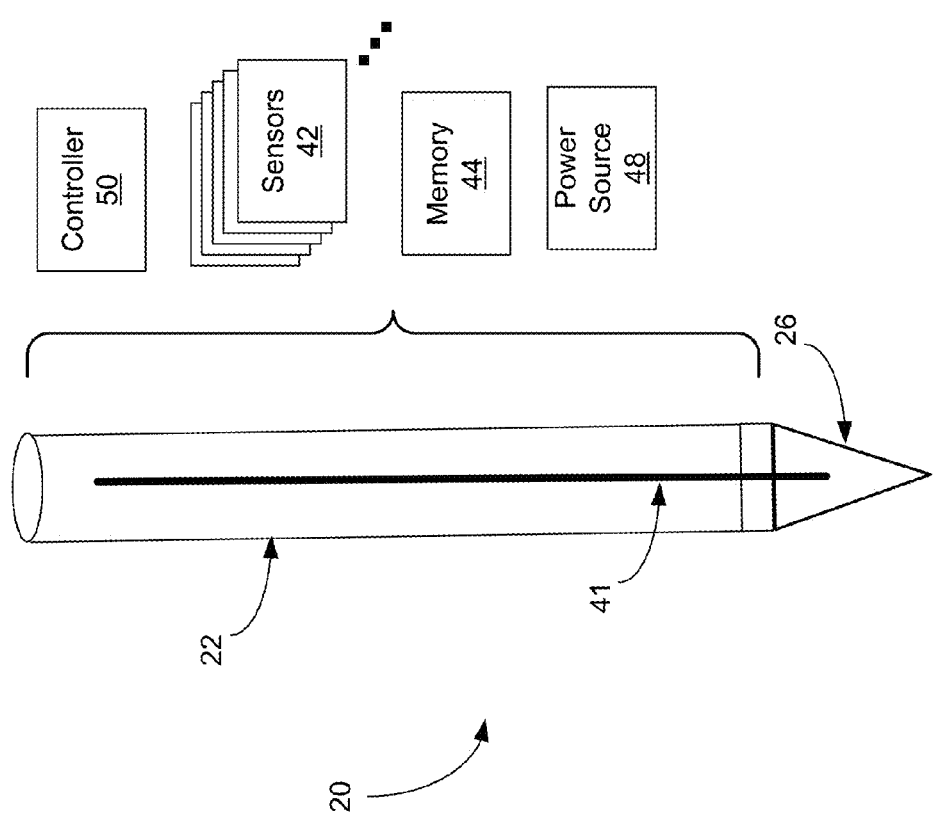
FIG. 3 illustrates an example active stylus interior.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
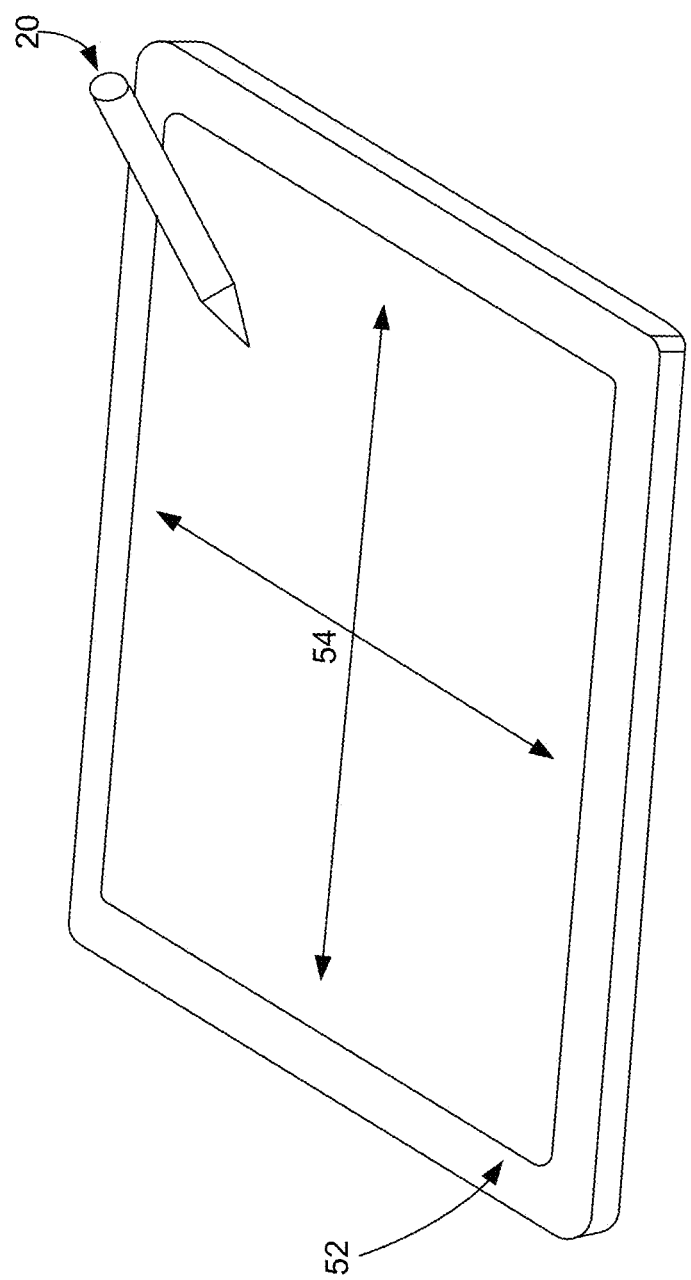
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5:
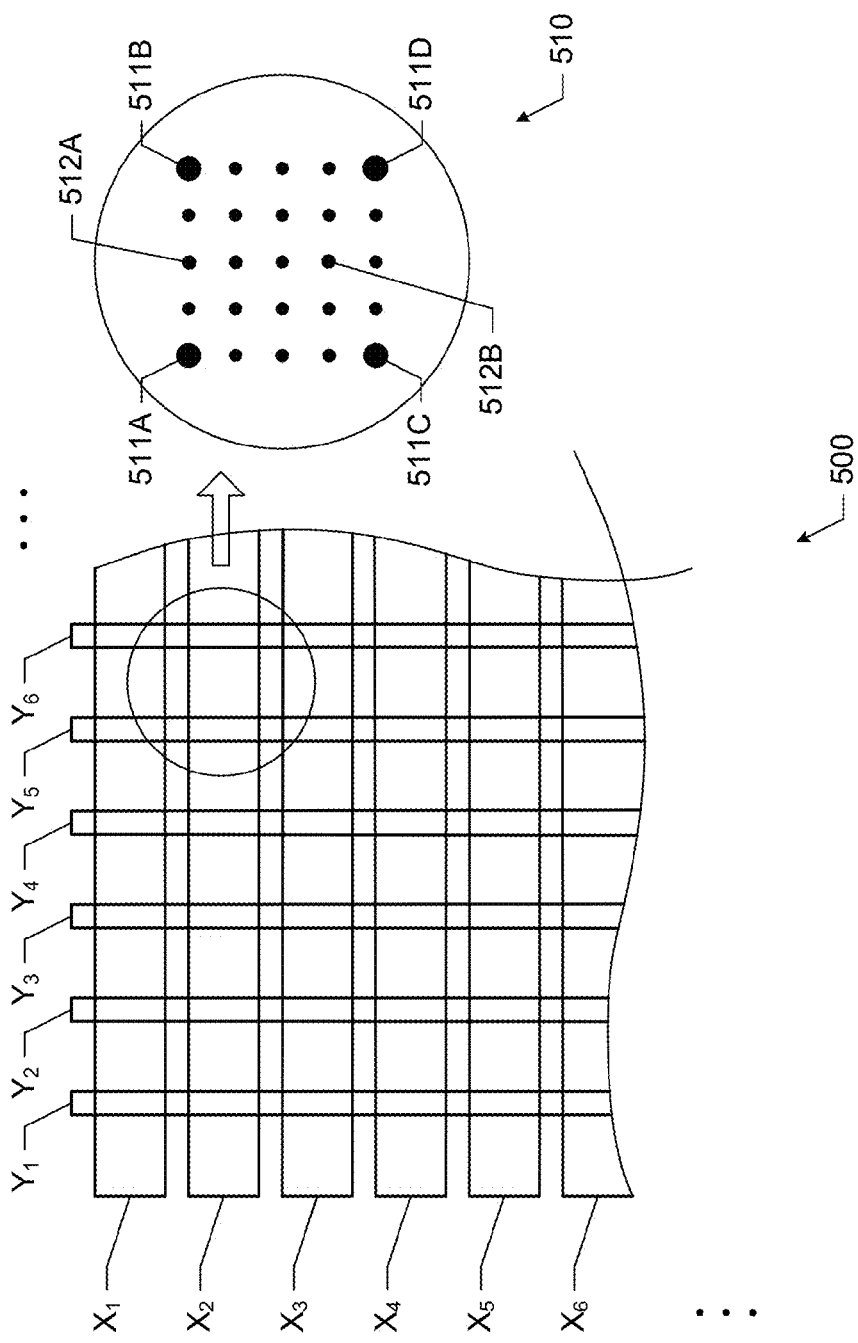
FIG. 5 illustrates an example array of electrodes.

As described above in connection with FIG. 1, in particular embodiments, a touch sensor (e.g., touch sensor 10 illustrated in FIG. 1) may include an array of drive and sense electrodes or an array of electrodes of a single type. These electrodes may be coupled to a controller (e.g., controller 12 illustrated in FIG. 1) by specific tracks (e.g., tracks 14 illustrated in FIG. 1). The drive unit of the controller may supply drive signals to the drive electrodes through some tracks, and the sense unit of the controller may sense charge at the capacitive nodes through other tracks. The electrodes may be arranged in various patterns and this disclosure contemplates any suitable patterns for the electrode arrangements. For example, FIG. 5 illustrates an example array of electrodes arranged in a X-Y grid pattern. In particular embodiments, the drive electrodes may be arranged along one set of lines (e.g., the X lines: $X_1$ to $X_n$) and the sense electrodes may be arranged along another set of lines (e.g., the Y lines: $Y_1$ to $Y_n$). The capacitive nodes are at one or more intersections of the X and Y lines. A touch-sensitive area 500 may be populated with these electrodes.

In particular embodiments, to determine the location of an object, such as a stylus or a user's finger, within a touch-sensitive area (e.g., touch-sensitive area 500), a scan of the electrodes or coordinates within the touch-sensitive area may be performed (e.g., driving the drive electrodes and scanning the capacitive nodes within touch-sensitive area 500). In some implementations, the drive electrodes are driven one line at a time. More specifically, a number of pulses (e.g., 3 or 4 pulses) is sent down each line of drive electrodes (e.g., each X line), and for each pulse, a number of signal samples (e.g., 1 or 2 samples) is read by scanning the corresponding capacitive nodes. For example, in FIG. 5, the drive electrodes along the $X_1$ line may be driven first; the charge is transferred through the capacitive coupling between the drive and sense lines; and the corresponding capacitive nodes along the Y lines (e.g., $Y_1$ to $Y_n$) may be scanned to take the signal samples. Then, the drive electrodes along the $X_2$ line are driven next; the charge is again transferred through the capacitive coupling between the drive and sense lines; and the corresponding capacitive nodes along the Y lines are scanned to take the signal samples. And so on, until the electrodes down the last line, $X_n$, are driven and the corresponding capacitive nodes down the Y lines are scanned to take the signal samples. In particular embodiments, the samples may be digitally quantized (e.g., via an analog-to-digital converter (ADC)). The digital samples are then transmitted in individual frames. In particular embodiments, a frame includes a full scan of some or all the capacitive nodes within a touch-sensitive area. As an example, in the case illustrated in FIG. 5, a frame includes [M×N]samples, where N denotes the number of X lines (e.g., drive lines) and M denotes the number of receive line.

Figure 6A:
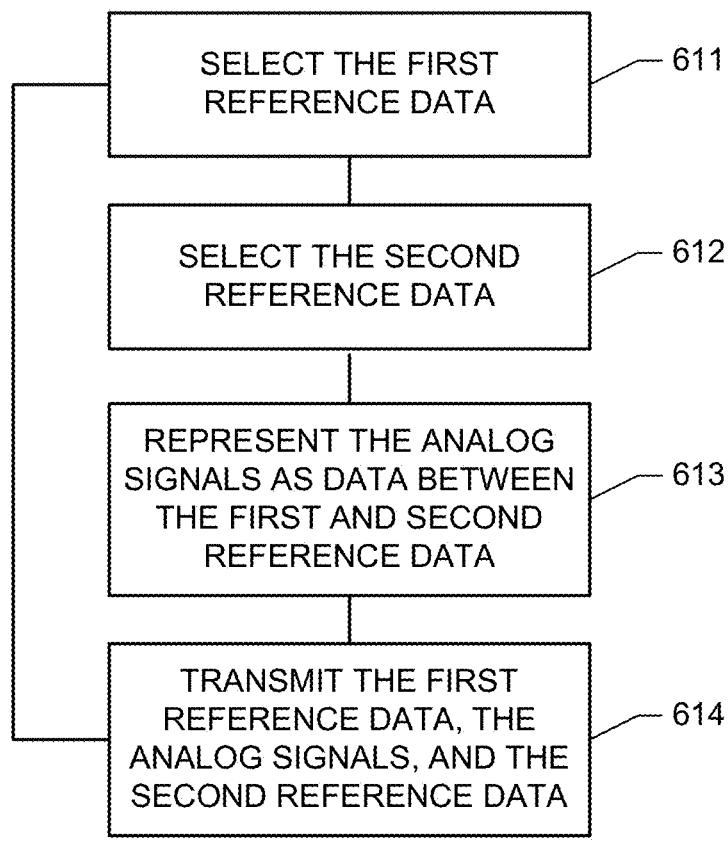
FIGS. 6A and 6B illustrate an example method for transmitting analog data between an active stylus and a touch-sensor controller.
Figure 6B:
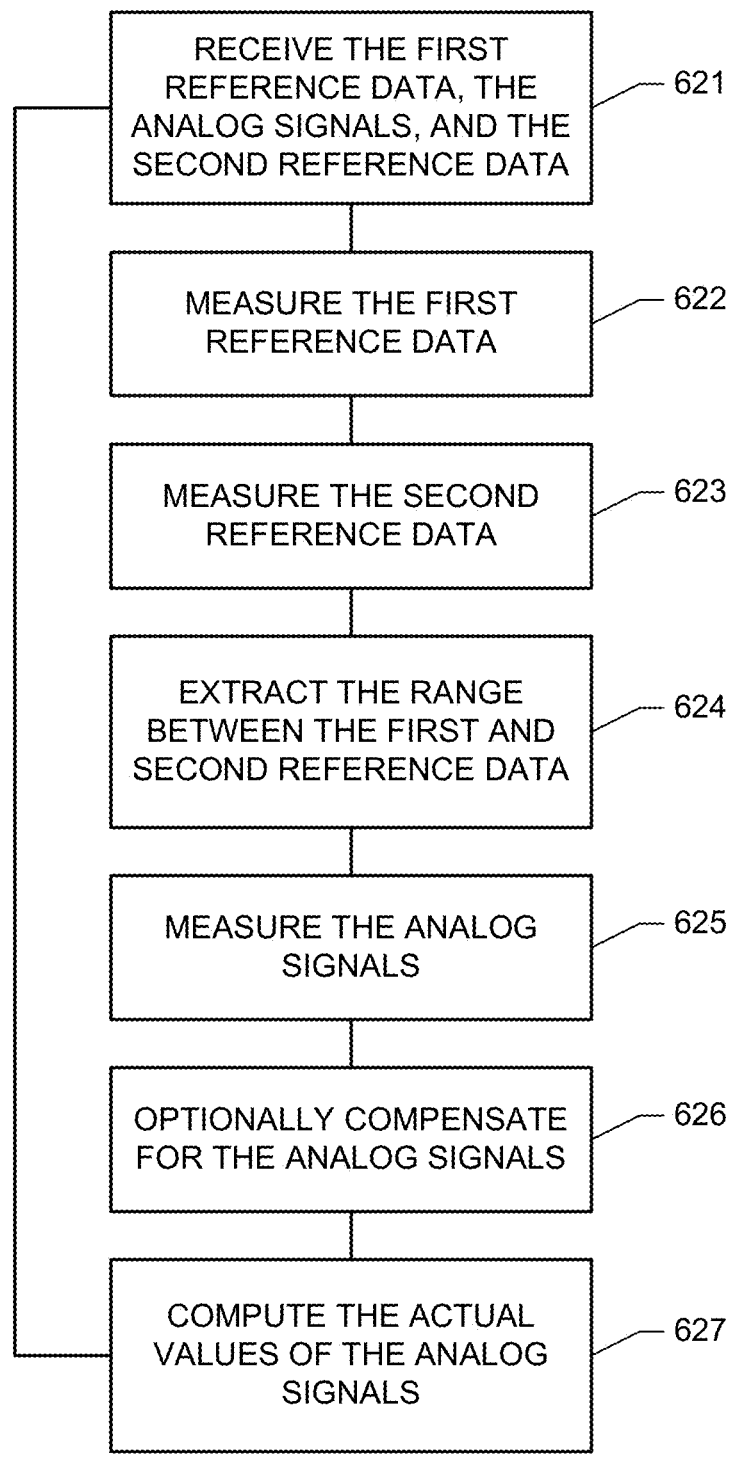

In particular embodiments, the signals measured at the capacitive nodes, such as voltage data, are analog signals. In order to prevent resolution loss that occurs during the quantization process, when communicating the signal data (e.g., voltage values) between an active stylus and a touch-sensor device, instead of sending the quantized version of the data, the actual analog data are sent. Sending analog data also helps increase signaling speed because, instead of using digitally encoded signals, an analog scaled reply is sent back to the capacitor controller. FIG. 6 illustrates an example method for transmitting analog data between an active stylus and a touch-sensor controller of a touch-sensor device. Note that the analog data may be transmitted either from the active stylus to the touch-sensor controller or from the touch-sensor controller to the active stylus. Thus, either the active stylus or the touch-sensor controller may be the data-transmitting component. Similarly, either the active stylus or the touch-sensor controller may be the data-receiving component. FIG. 6A illustrates the steps performed by the data-transmitting component, and FIG. 6B illustrates the steps performed by the data-receiving component. In addition, the analog data transmitted between the stylus and the touch-sensor controller may be any type of data, including but not limited to voltage signals obtained by scanning the capacitive nodes.

At the transmitting end (FIG. 6A), in particular embodiments, data (e.g., analog data) are represented as pulses. Each pulse has a specific amplitude. A set of pulses may be transmitted in a frame. In particular embodiments, there are two reference data used, represented as two sets of pulses respectively. The first reference data represent a first reference value, and the second reference data represent a second reference value. For example, the values may correspond to specific voltage levels. In some implementations, the first reference data indicate a lower boundary of a data range, and the second reference data indicate an upper boundary of the data range. In particular embodiments, the data-transmitting component (e.g., either a stylus or a touch-sensor controller) may select the first reference data and the second reference data (as illustrated in STEPS 611 and 612 of FIG. 6A) based on the analog data to be transmitted. For example, the first reference data may be less than or equal to the analog data to be transmitted, and the second reference data may be greater than or equal to the analog data to be transmitted. This ensures that the analog data are within the range delimited by the first reference data and the second reference data. In some implementations, the second reference data are determined by multiplying the first reference data with a gain.

Figure 7:
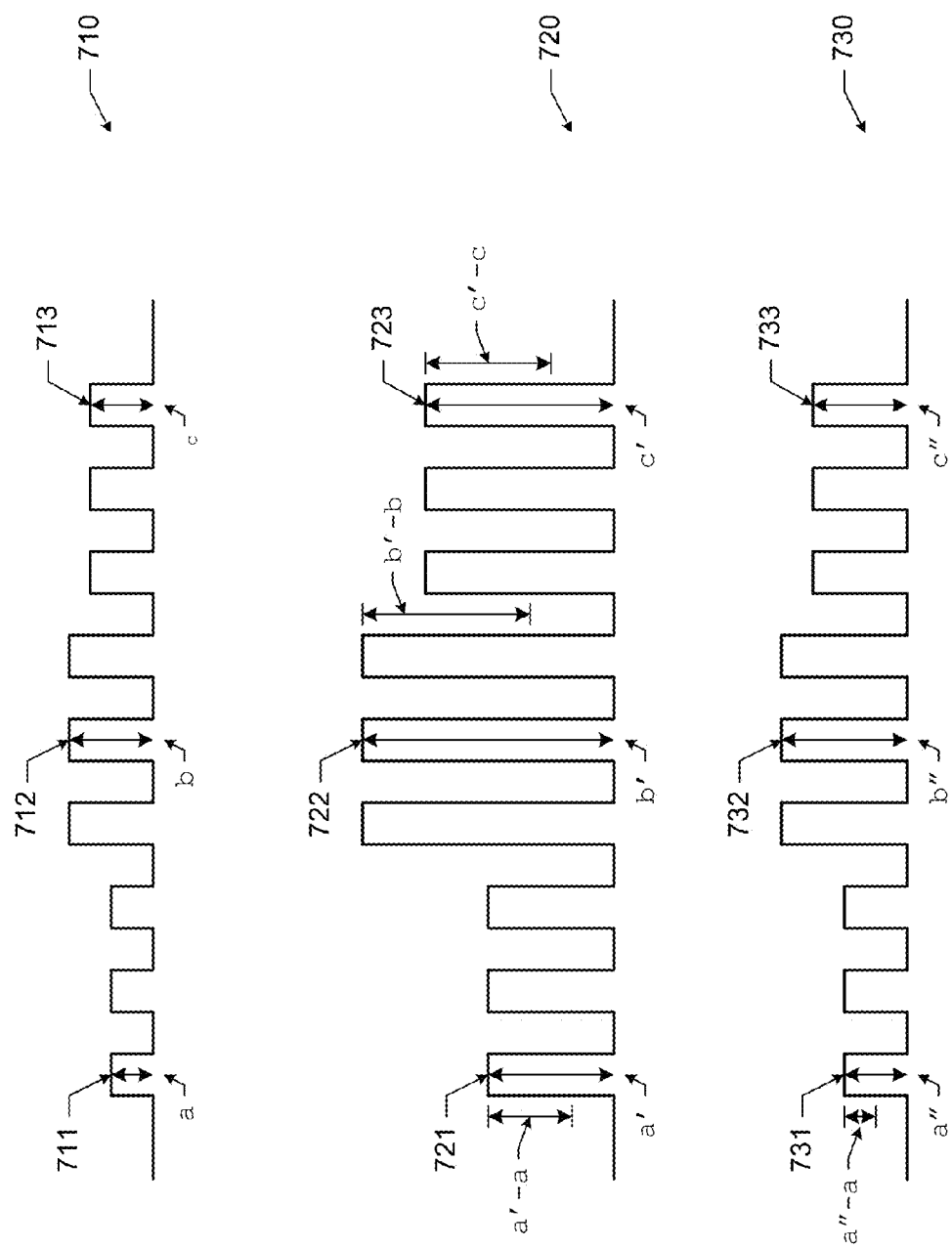
FIG. 7 illustrates example signals.

Using the example pulses illustrated in FIG. 7 to further explain the relationship between the reference data and analog data, in this case, a set of pulses 710 represents the first reference data. Pulse set 710 includes 9 pulses having 3 different amplitudes. Suppose that pulses 711 each have an amplitude value of "a"; pulses 712 each have an amplitude value of "b"; and pulses 713 each have an amplitude value of "c". Note that only 9 pulses are illustrated in each set to simplify the discussion. In practice, each pulse set may include any number of pulses having same or different amplitudes.

A second set of pulses 720 represents the second reference data. In particular embodiments, pulse set 720 representing the second reference data are obtained by multiplying each pulse in pulse set 710, which represents the first reference data, with a specific gain. Suppose that pulses 721 each have an amplitude value of "a'"; pulses 722 each have an amplitude value of "b'"; and pulses 723 each have an amplitude value of "c'". Pulses 721 are obtained by multiplying the corresponding pulses 711 with the gain; pulses 722 are obtained by multiplying the corresponding pulses 712 with the gain; and pulses 723 are obtained by multiplying the corresponding pulses 713 with the gain. Suppose that the gain is "k". Then, a'=a×k; b'=b×k; and c'=c×k. This is equivalent to a'/a=b'/b=c'/c=k. If "k" is positive, then a'>a; b'>b; and c'>c. Furthermore, between pulses 711 and 721, the difference in their amplitudes is a'−a; between pulses 712 and 722, the difference in their amplitudes is b'−b; and between pulses 713 and 723, the difference in their amplitudes is c'−c. Alternatively, in other embodiments, the amplitudes of pulses 711, 712, and 713 and pulses 721, 722, and 723 may be selected based on the values of the analog data to be transmitted. In either case, between a pair of corresponding pulse from the first reference data and the second reference data (e.g., between pulses 711 and 721), respectively, there is a difference between the two amplitudes of the two pulses (e.g., "a'−a"), and this amplitude difference corresponds to a data range.

In particular embodiments, the first reference data represent a first reference value, and the second reference data represent a second reference value. The two reference values together delimit a range of values (e.g., the first reference value indicating the lower bound of the value range and the second reference value indicating the upper bound of the value range). These two reference values may be any values. For example, each reference value may correspond to a different voltage level. In one example, the first reference value may be 0 and the second reference value may be 1. The value range is 1. In another example, the first reference value may be 1 and the second reference value may be 100. The value range is 100 (e.g., second reference value−first reference value+1). In a third example, the first reference value may be 41 and the second reference value may be 80. The value range is 40. In particular embodiments, again, the first and second reference values together delimit a range of values, with the first reference value indicating the lower bound of the range and the second reference value indicating the upper bound of the range.

In particular embodiments, the data-transmitting component represents the analog data to be transmitted as a set of pulses with amplitudes between those of the pulses representing the first and second reference data (as illustrated in STEP 613 of FIG. 6A). For example, in the case illustrated in FIG. 7, a set of pulses 730 represents the analog data to be transmitted. These pulses have a corresponding relationship with the pulses in pulse set 710 and pulse set 720. For example, pulses 731 each have an amplitude between the amplitudes of pulses 711 and 721; pulses 732 each have an amplitude between the amplitudes of pulses 712 and 722; and pulses 733 each have an amplitude between the amplitudes of pulses 713 and 723.

As described above, pulse set 710 represents the first reference data and pulse set 720 represents the second reference data. The first and second reference data together delimit a value range, which corresponds to the differences in amplitudes between pulse set 710 and pulse set 720. For example, suppose that the first reference value is 0 and the second reference value is 1. The range of values is between 0 and 1. For pulses 711 and 721, this range corresponds to the amplitude difference "a'−a"; for pulses 712 and 722, this range corresponds to the amplitude difference "b'−b"; and for pulses 713 and 723, this range corresponds to the amplitude difference "c'−c". Suppose that the analog data to be transmitted have a value of 0.25, which is between the value range of 0 and 1. If pulse set 710 represents reference data 0 and pulse set 720 represents reference data 1, then for pulses 731, its amplitude "a''" is a''=a+0.25×(a'−a); for pulses 732, the amplitude is b''=b+0.25×(b'−b); and for pulses 733, the amplitude is c''=c+0.25×(c'−c). As another example, suppose that the first reference value is 1 and the second reference value is 100. The range of values is between 1 and 100. If the analog data have a value of 65, then, for pulses 731, the amplitude is a''=a+65/100×(a'−a); for pulses 732, the amplitude is b''=+65/100×(b'−b); and pulses 733, the amplitude is c''=c+65/100×(c'−c).

To briefly summarize, the differences between the amplitudes of the corresponding pulses representing the first reference data and the amplitudes of the corresponding pulses representing the second reference data (e.g., "a'−a") represent a range of values (e.g., between 1 and 100), with the first reference data indicating the lower bound of the range (e.g., 1) and the second reference data indicating the upper bound of the range (e.g., 100). For the set of pulses representing the analog data to be transmitted (e.g., pulse set 730), the amplitude of each pulse is greater than or equal to the amplitude of the corresponding pulse representing the first reference data (e.g., "a") and less than or equal to the amplitude of the corresponding pulse representing the second reference data (e.g., "a'"). Furthermore, the amplitude of each pulse (e.g., pulse 731) is determined as the amplitude of the corresponding pulse representing the first reference data (e.g., "a") plus a percentage (e.g., between 0% and 100%) of the difference between the amplitude of the corresponding pulse representing the first reference data and the amplitude of the corresponding pulse representing the second reference data (e.g., "a'−a"). This percentage is determined as the analog data value (e.g., 65) divided by the full value range (e.g., percentage=65/100).

In particular embodiments, the first reference data, the analog data, and the second reference data are transmitted successively (as illustrated in STEP 614 of FIG. 6A) to the data-receiving component (e.g., a touch-sensor controller or a stylus). In some implementations, first, the set of pulses (e.g., pulse set 710) representing the first reference data is sent in one frame. Next, the set of pulses (e.g., pulse set 730) representing the analog data is sent in the second frame. And finally, the set of pulses (e.g., pulse set 720) representing the second reference data is sent in the third frame. Thus, it takes three frames (e.g., 2 reference frames and 1 data frame) to send the analog data. Note that the order of sending the reference and analog data may differ in different implementations.

At the receiving end (FIG. 6B), in particular embodiments, upon receiving the first reference data, followed by the analog data, followed by the second reference data (as illustrated in STEP 621 of FIG. 6B), the data-receiving component (e.g., either a touch-sensor controller or a stylus) measures the first reference data (as illustrated in STEP 622 of FIG. 6B) and the second reference data (as illustrated in STEP 623 of FIG. 6B). In some implementations, as described above, the first reference data, the analog data, and the second reference data are represented using three sets of pulses, respectively. The data-receiving component may measure the amplitudes of the individual pulses. The data-receiving component may extract the range delimited by the first reference data and the second reference data (as illustrated in STEP 624 of FIG. 6B). In some implementation, the data-receiving component may compute the differences between the amplitudes of corresponding pulses representing the first and second reference data, respectively. For example, in the case illustrated in FIG. 7, between pulses 711 and 721, the data range is represented as "a'−a"; between pulses 712 and 722, the data range is represented as "b'−b"; and between pulses 713 and 723, the data range is represented as "c'−c".

In particular embodiments, the data-receiving component may measure the analog data received from the data-transmitting component (as illustrated in STEP 625 of FIG. 6B) by, for example, measuring the amplitudes of the pulses representing the analog data.

Optionally, in particular embodiments, the measured analog data may be compensated for noise or other inaccuracies that often occur in less than ideal situations (as illustrated in STEP 625 of FIG. 6B). In some implementations, a lookup table is created for the coordinates within a touch-sensitive area, and this lookup table is used to compensate the measured analog data. For example, when the analog data are voltage levels or coordinates obtained by scanning the capacitive nodes within the touch-sensitive area, the lookup table may be used to compensate for such types of analog data.

To further explain, consider the example grid of electrodes illustrated in FIG. 5. The capacitive nodes are at the intersections of the drive and scan electrodes. Using a small section 510 of touch-sensitive area 500 to simplify the discussion, section 510 includes 4 capacitive nodes 511A, 511B, 511C, 511D. When a stylus moves around touch-sensitive area 500, it may be at a coordinate coincide with one of the capacitive nodes or it may be at a coordinate in between a number of capacitive nodes. For example, coordinate 512A is mostly in between nodes 511A and 511B, whereas coordinate 512B is in between nodes 511A, 511B, 511C, and 511D. A touch-sensor device is often able to determine more distinct coordinates within its touch-sensitive area than the actual number of capacitive nodes included in the touch-sensitive area. This is because coordinates in between the capacitive nodes can also be detected.

In some implementations, the capacitive nodes are scanned to measure the signals (e.g., voltage levels) at these nodes. The signal for each coordinate is interpolated using the signals measured at the capacitive nodes near that coordinate. In some implementations, if a capacitive node is nearer a specific coordinate, then that capacitive node has more influence on the coordinate. Conversely, if a capacitive node is farther away from a specific coordinate, then that capacitive node has less influence on the coordinate.

In the example case illustrated in FIG. 5, for coordinate 512A, since it is located mainly in between capacitive nodes 511A and 511B, the signals from capacitive nodes 511A and 511B have more influence on coordinate 512A. Furthermore, since coordinate 512A is located approximately halfway in between capacitive nodes 511A and 511B, the signal influence of capacitive nodes 511A and 511B on coordinate 512A is about the same. Thus, the signal at coordinate 512A may be interpolated as 50% of the signal measured at capacitive nodes 511A plus 50% of the signal measured at capacitive nodes 511B. In addition, since capacitive nodes 511C and 511D are somewhat near coordinate 512A, their influence may also be taken into consideration when interpolating and calculating the signal at coordinate 512A (e.g., 45% of the signal measured at capacitive nodes 511A+45% of the signal measured at capacitive nodes 511B+5% of the signal measured at capacitive nodes 511C+5% of the signal measured at capacitive nodes 511D). Similarly, for coordinate 512B, its signal may be calculated by interpolating the signals measured at capacitive nodes 511A, 511B, 511C, and 511D since this coordinate is located in between these 4 capacitive nodes. Furthermore, since coordinate 512B is closer to capacitive nodes 511C and 511D than capacitive nodes 511A and 511B, capacitive nodes 511C and 511D have more influence on coordinate 512B than capacitive nodes 511A and 511B (e.g., 12.5% of the signal measured at capacitive nodes 511A+12.5% of the signal measured at capacitive nodes 511B+37.5% of the signal measured at capacitive nodes 511C+37.5% of the signal measured at capacitive nodes 511D).

Due to noises and other inaccuracies or interpolation, sometimes, the signal actually obtained for each coordinate in practice is not always the expected signal that should be obtained for that coordinate. For example, suppose that in a specific situation (e.g., when a set of pulses with a specific amplitude is used to drive the drive electrodes), the expected signal obtained for coordinate 512A should be 100. However, the actual signal obtained for coordinate 512A (e.g., by interpolating the signals measured at nearby capacitive nodes) is 80. In order to make the actually obtained signal (e.g., 80) to be closer to or the same as the expected signal (e.g., 100), the obtained signal may be compensated using a compensation factor. In some implementations, a compensation factor of 5/4, used with multiplication, should bring the obtained signal to be the same as the expected signal (e.g., 80×5/4=100) for coordinate 512A. Alternatively, in some implementations, a compensation factor of 20, used with addition, can also bring the obtained signal to be the same as the expected signal (e.g., 80+20=100) for coordinate 512A. Similarly, for a coordinate coincide with capacitive node 511A, suppose that the actual signal obtained is 95, while the expected signal should be 100. Then, in some implementations, a compensation factor of 100/95, used with multiplication, is sufficient to bring the actual signal to be the same as the expected signal (e.g., 95×100/95=100). Alternatively, in some implementations, a compensation factor of 5, used with addition, is sufficient to bring the actual signal to be the same as the expected signal (e.g., 95+5=100).

In particular embodiments, a lookup table of the compensation factors for the different coordinates within a touch-sensitive area is established. Controlled measurements are taken for the individual coordinates. In some implementations, a set of pulses with a specific amplitude is used to drive each line of drive electrodes. Suppose that with this particular set of pulses, the measured signal at each coordinate should be 100. A signal is then actually obtained from a specific coordinate. This obtained signal is compared with the expected signal (e.g., 100), and a compensation factor is determined (e.g., 100/obtained signal) to bring the obtained signal to be the same as the expected signal. The compensation factor is saved in the lookup table for this specific coordinate. This process may be repeated for other coordinates within the touch-sensitive area to determine the compensation factors for the individual coordinates.

In some implementations, it is not necessary to physically determine the compensation factor for each and every coordinate within an entire touch-sensitive area. Instead, a smaller section (e.g., a 10-by-10 grid) within the touch-sensitive area may be selected, and the compensation factors of the coordinates within this section are determined for the individual coordinates. The same compensation factors are then used for corresponding coordinates in other similar sections (e.g., other 10-by-10 grids).

Once the lookup table is established, it may be used to compensate for the signals actually obtained for specific coordinates. In particular embodiments, when an analog signal is obtained for a specific coordinate, this signal is multiplied by the compensation factor for that coordinate stored in the lookup table (as illustrated in STEP 626 of FIG. 6B). This helps bring the obtained signal closer to the expected signal.

At the data-receiving end, in particular embodiments, the actual values of the analog data (e.g., voltage levels) may be computed (as illustrated in STEP 627 of FIG. 6B) by, for example, comparing the amplitudes (optionally compensated) of the pulses sent in the data frame with the amplitudes of the pulses sent in the two reference frames. For example, the range of the values is determined by determining the differences between the amplitudes of the corresponding pulses in the first reference frame and the amplitudes of the corresponding pulses in the second reference frame (e.g., a'−a). The lower bound of the data range is indicated by the amplitudes of the pulses in the first reference frame (e.g., "a"), and the upper bound is indicated by the amplitudes of the pulses in the second reference frame (e.g., "b'"). The value of an analog signal represented by a pulse (e.g., pulse 731) may be determined by first subtracting the amplitude of the corresponding pulse (e.g., pulse 711) representing the lower bound from the amplitude of the pulse representing the data signal, and then determining the percentage within the value range the result of the subtraction is at (e.g., analog value=(a"−a)/(a'−a)×range).

In particular embodiments, STEPS 611-614 of FIG. 6A and STEPS 621-627 of FIG. 6B may be repeated for each frame of analog signals obtained. Again, it takes three frames (e.g., 2 reference frames and 1 signal frame) to send one frame of analog signals. The first and second reference data may differ from one frame of signal data to another frame of signal data. In other words, the reference data may be independently selected for each frame of analog signals as needed. For example, suppose that a set of analog signals is obtained for the coordinates within a touch-sensitive area (e.g., by scanning the capacitive nodes within the touch-sensitive area). For this specific set of analog signals, the first reference data should be less than or equal to the smallest value of the analog signals and the second reference data should be greater than or equal to the largest values of the analog signals. Since the first reference data indicate the lower bound and the second reference data indicate the upper bound of a range of values, this ensures that all the analog signal values fall within the value range indicated by the first and second reference data.

With the method illustrated in FIGS. 6A and 6B, fewer frames or other information-conveying time periods are required to send the analog data. For example, it takes 10 frames to send 10-bit digital data. On the other hand, it takes only 3 frames to send the corresponding analog data. This allows a dramatic speed up in communication. In addition, without performing quantization of the analog data, it prevents resolution loss occurring during the quantization process.

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
one or more processors of a data-transmitting component; and
one or more memory units of the data-transmitting component, the one or more memory units coupled to the one or more processors and collectively storing logic configured to, when executed by the one or more processors, cause the one or more processors to perform operations comprising:
selecting a set of first reference values indicating a lower bound of a range of values;
selecting a set of second reference values indicating an upper bound of the range of values;
representing the set of first reference values as a set of first pulses, each first pulse corresponding to a specific first reference value and having a first amplitude representing the lower bound of the range of values;
representing the set of second reference values as a set of second pulses, each second pulse corresponding to a specific second reference value and having a second amplitude representing the upper bound of the range of values;
representing a set of analog values as a set of third pulses, each third pulse corresponding to a specific analog value and having a third amplitude between the first amplitude of a corresponding first pulse and the second amplitude of a corresponding second pulse that is determined based on a percentage of the corresponding analog value within the range of values, wherein representing the set of analog values comprises, for each third pulse, determining its third amplitude as: $a3=a1+s/r\times(a2-a1)$, where:
a3 denotes the third amplitude of the third pulse;
a1 denotes the first amplitude of the corresponding first pulse;
a2 denotes the second amplitude of the corresponding second pulse;
s denotes the corresponding analog value; and
r denotes the range of values indicated by the upper bound and the lower bound; and
transmitting the set of first pulses, the set of third pulses, and the set of second pulses to a data-receiving component.

2. The apparatus of claim 1, wherein the data-receiving component is configured to perform operations comprising:
receiving the set of first pulses, the set of third pulses, and the set of second pulses from the data-transmitting component;
measuring the first amplitude of each first pulse, the second amplitude of each second pulse, and the third amplitude of each third pulse;
determining the range of values based on a set of first amplitudes of the set of first pulses and a set of second amplitudes of the set of second pulses; and
computing the set of analog values based on a set of third amplitudes of the set of third pulses, each analog value being determined based on the third amplitude of the corresponding third pulse, the first amplitude of the corresponding first pulse, the second amplitude of the corresponding second pulse, and the range of values.

3. The apparatus of claim 1, wherein the data-transmitting component is a stylus or a touch-sensor controller coupled to a touch sensor.

4. The apparatus of claim 1, wherein representing the set of second reference values comprises, for each second pulse, determining its second amplitude by multiplying the first amplitude of a corresponding first pulse with a gain.

5. The apparatus of claim 1, wherein the set of first reference values and the set of second reference values are selected based on the set of analog values.

6. The apparatus of claim 5, wherein:
the lower bound of the range of values is less than or equal to a smallest analog value from the set of analog values;

the upper bound of the range of values is greater than or equal to a largest analog value from the set of analog values; and for each corresponding pair of first pulse and second pulse, the difference between the second amplitude of the second pulse and the first amplitude of the first pulse corresponds to the range of values.

7. An apparatus comprising:

one or more processors of a data-receiving component; and one or more memory units of the data-receiving component, the one or more memory units coupled to the one or more processors and collectively storing logic configured to, when executed by the one or more processors, cause the one or more processors to perform operations comprising:

receiving a set of first pulses representing a set of first reference values, a set of third pulses representing a set of analog values, and a set of second pulses representing a set of second reference values from a data-transmitting component, each first pulse corresponding to a specific first reference value and having a first amplitude representing a lower bound of a range of values;

each second pulse corresponding to a specific second reference value and having a second amplitude representing an upper bound of the range of values;

each third pulse corresponding to a specific analog value and having a third amplitude between the first amplitude of a corresponding first pulse and the second amplitude of a corresponding second pulse;

measuring the first amplitude of each first pulse, the second amplitude of each second pulse, and the third amplitude of each third pulse;

determining the range of values based on a set of first amplitudes of the set of first pulses and a set of second amplitudes of the set of second pulses; and computing the set of analog values based on a set of third amplitudes of the set of third pulses, each analog value being determined based on the third amplitude of the corresponding third pulse, the first amplitude of the corresponding first pulse, the second amplitude of the corresponding second pulse, and the range of values.

8. The apparatus of claim 7, wherein the data-transmitting component is configured to perform operations comprising:

selecting the set of first reference values indicating the lower bound of the range of values;

selecting the set of second reference values indicating the upper bound of the range of values;

representing the set of first reference values as the set of first pulses;

representing the set of second reference values as a set of second pulses;

representing the set of analog values as the set of third pulses, the third amplitude of each third pulse being determined based on a percentage of the corresponding analog value within the range of values; and transmitting the set of first pulses, the set of third pulses, and the set of second pulses to the data-receiving component.

9. The apparatus of claim 7, wherein the data-receiving component is a touch-sensor controller coupled to a touch sensor or a stylus.

10. The apparatus of claim 7, wherein determining the range of values comprises:

extracting the lower bound of the range of values based on the set of first amplitudes of the set of first pulses;

extracting the upper bound of the range of values based on the set of second amplitudes of the set of second pulses; and computing the range of values based on the lower bound and the upper bound.

11. The apparatus of claim 7, wherein computing the set of analog values comprises, for each analog value, determining the analog value as $s = (a3-a1)/(a2-a1) \times r$, where:

s denotes the analog value;

a3 denotes the third amplitude of the corresponding third pulse;

a1 denotes the first amplitude of the corresponding first pulse;

a2 denotes the second amplitude of the corresponding second pulse; and r denotes the range of values indicated by the upper bound and the lower bound.

12. The apparatus of claim 7, wherein the set of analog values are obtained for a set of coordinates, respectively, within a touch-sensitive area of a touch sensor of the apparatus.

13. The apparatus of claim 12, wherein the operations further comprise compensating the set of analog values by performing operations comprising adjusting each analog value with a compensation factor determined for a specific coordinate within the touch-sensitive area for which the analog value is obtained.

14. A method comprising: by a data-transmitting component of an apparatus, selecting a set of first reference values indicating a lower bound of a range of values;

selecting a set of second reference values indicating an upper bound of the range of values;

representing the set of first reference values as a set of first pulses, each first pulse corresponding to a specific first reference value and having a first amplitude representing the lower bound of the range of values;

representing the set of second reference values as a set of second pulses, each second pulse corresponding to a specific second reference value and having a second amplitude representing the upper bound of the range of values;

representing a set of analog values as a set of third pulses, each third pulse corresponding to a specific analog value and having a third amplitude between the first amplitude of a corresponding first pulse and the second amplitude of a corresponding second pulse that is determined based on a percentage of the corresponding analog value within the range of values, wherein representing the set of analog values comprises, for each third pulse, determining its third amplitude as: $a3 = a1 + s/r \times (a2-a1)$, where:

a3 denotes the third amplitude of the third pulse;

a1 denotes the first amplitude of the corresponding first pulse;

a2 denotes the second amplitude of the corresponding second pulse;

s denotes the corresponding analog value; and r denotes the range of values indicated by the upper bound and the lower bound; and transmitting the set of first pulses, the set of third pulses, and the set of second pulses to a data-receiving component of the apparatus.

15. The method of claim 14, wherein representing the set of second reference values comprises, for each second pulse, determining its second amplitude by multiplying the first amplitude of a corresponding first pulse with a gain.

16. The method of claim 14, wherein the set of first reference values and the set of second reference values are selected based on the set of analog values, such that:

the lower bound of the range of values is less than or equal to a smallest analog value from the set of analog values;

the upper bound of the range of values is greater than or equal to a largest analog value from the set of analog values; and for each corresponding pair of first pulse and second pulse, the difference between the second amplitude of the second pulse and the first amplitude of the first pulse corresponds to the range of values.

17. The method of claim 14, further comprising: by the data-receiving component of the apparatus, receiving the set of first pulses, the set of third pulses, and the set of second pulses from the data-transmitting component;

measuring the first amplitude of each first pulse, the second amplitude of each second pulse, and the third amplitude of each third pulse;

determining the range of values based on a set of first amplitudes of the set of first pulses and a set of second amplitudes of the set of second pulses; and computing the set of analog values based on a set of third amplitudes of the set of third pulses, each analog value being determined based on the third amplitude of the corresponding third pulse, the first amplitude of the corresponding first pulse, the second amplitude of the corresponding second pulse, and the range of values.

18. The method of claim 17, wherein computing the set of analog values comprises, for each analog value, determining the analog value as $s=(a3-a1)/(a2-a1) \times r$, where:

s denotes the analog value;

a3 denotes the third amplitude of the corresponding third pulse;

a1 denotes the first amplitude of the corresponding first pulse;

a2 denotes the second amplitude of the corresponding second pulse; and r denotes the range of values indicated by the upper bound and the lower bound.

* * * * *